United States Patent Office 3,379,748
Patented Apr. 23, 1968

3,379,748
ORGANO-MERCURY DERIVATIVE
Norman Henry Pearce, Hull, England, assignor to The Distillers Company Limited, Edinburgh, Scotland, a British company
No Drawing. Filed Sept. 18, 1964, Ser. No. 397,644
Claims priority, application Great Britain, Oct. 19, 1963, 41,389/63; Mar. 11, 1964, 10,222/64
1 Claim. (Cl. 260—431)

ABSTRACT OF THE DISCLOSURE

The present invention provides for a process of producing an organo-mercury derivative which comprises reacting ketene with a mercuric salt which is in solution in a medium which is substantially inert to ketene under the reaction conditions. The invention also concerns organo-mercury derivatives having the formula

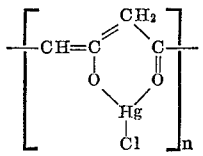

where $n$ is an integer.

---

This invention relates to an organo-mercury derivative and to a process for its production.

The present invention provides a process for the production of an organo-mercury derivative, which comprises reacting ketene with a mercuric salt which is in solution in a medium which is substantially inert to ketene under the reaction conditions.

The reaction may suitably be carried out by dissolving a mercuric salt in the medium and passing ketene gas through the solution while stirring. The reaction may take place at a temperature within a relatively wide range, but it may in some respects be advantageous to employ a temperature above 10° C. The reaction can take place at subatmospheric pressure or at superatmospheric pressure, but it is preferred to employ substantially atmospheric pressure.

Most mercuric salts may be employed in the reaction, provided that they are suitably soluble in the reaction medium and further provided that they do not give rise to undesired by-products when allowed to react with ketene, e.g. mercuric nitrate can give rise to the formation of tetranitromethane. The mercuric salt is preferably a halide; the medium may be any inert medium which dissolves the mercuric salt and which is inert to ketene, and may include liquid esters and liquid ketones. Ethyl acetate is, for example, a suitable medium when the mercuric salt is mercuric chloride.

In the process of the invention, the solid organo-mercury derivative is deposited in solid form from the solution during the course of the reaction. The compound is substantially insoluble in most organic solvents, but forms a solution in dimethylformamide.

The organo-mercury derivative derived from the reaction in solution between a mercuric salt and ketene is believed to be a polymer having repeating units of the formula

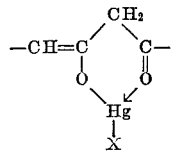

where X is the anionic moiety of the mercuric salt. The solid derivative from the reaction between mercuric chloride and ketene in ethyl acetate, for example, is considered to be composed of repeating units:

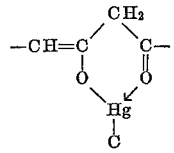

This compound possesses considerable biological activity, being effective, for example, in the eradication and prevention of moss growth.

The invention is illustrated by the following examples.

Example 1

A solution of mercuric chloride in ethyl acetate, containing 100 grams of mercuric chloride per litre of solution was stirred in a reactor and ketene gas was passed through it at a rate of one mole of ketene per hour. Passage of ketene was stopped after an amount equivalent to two moles of ketene per mole of mercuric chloride had been fed to the reactor. During the whole of the reaction, the reactor was maintained at a temperature below 0° C.

A yellow solid was precipitated, and this was filtered off and dried. The yield of crude product was approximately quantitative, assuming that two moles of ketene reacted with one mole of mercuric chloride.

Example 2

Ketene was passed into a solution of 300 grams of mercuric chloride in 2,700 grams of ethyl acetate at a rate of approximately 1 gram mole per hour for two hours, by which time 84 grams of ketene had been passed into the solution. The temperature of the solution varied from 13 to 280 C.

The product of the reaction weighed 255 grams, and the residual ethyl acetate was recovered.

The organo-mercury derivative obtained had the following ultimate analysis.—Calc. for $C_4H_3O_2HgCl$ (in percent weight by weight): Hg, 62.8; Cl, 77.1; C, 15.1; H, 0.9. Found: Hg, 61–63; Cl, 10–11; C, 13–14; H, 1.3–1.5.

Example 3

Organo mercury derivative prepared by the method of Example 1 was dispersed in dimethylformamide to give a 30% w./w. solution which remained stable for a period of several days. This solution (100 ml.) was mixed with water (1 gallon) to provide a colloidal solution. This colloidal solution was applied at a dosage of 500 ml./sq. metre to a mossed lawn. Within two days the moss had been killed without apparent detriment to the grass.

I claim:
1. An organo-mercury derivative having the formula
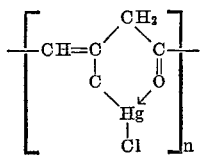
where $n$ is an integer.
References Cited
UNITED STATES PATENTS
2,284,067  5/1942  Ralston _____ 260—431
2,924,614  2/1960  Reuter _____ 260—429.5 XR
3,227,740  1/1966  Fenton _____ 260—431 XR
OTHER REFERENCES
Chemical Abstracts I, vol. 56, p. 12920d (1962).
Chemical Abstracts II, vol. 51, p. 16186 (1957).
TOBIAS E. LEVOW, *Primary Examiner.*
HELEN M. S. SNEED, *Assistant Examiner.*